US010229387B2

(12) United States Patent
Wade et al.

(10) Patent No.: US 10,229,387 B2
(45) Date of Patent: Mar. 12, 2019

(54) INFORMATION AND TRACKING MARKING SYSTEM AND METHOD WITH MODIFIABLE MARKS

(71) Applicant: VALIDFILL LLC, Bradenton, FL (US)

(72) Inventors: Jeremy Wade, Bradenton, FL (US); Loren Ostema, Sarasota, FL (US); Christian Kersey, Bradenton, FL (US); Paul Wade, Bradenton, FL (US); Alex Whiteaker, Bradenton, FL (US)

(73) Assignee: ValidFill LLC, Bradenton, FL (US)

( * ) Notice: Subject to any disclaimer, the term of this patent is extended or adjusted under 35 U.S.C. 154(b) by 24 days.

(21) Appl. No.: 15/491,309

(22) Filed: Apr. 19, 2017

(65) Prior Publication Data

US 2017/0330137 A1    Nov. 16, 2017

Related U.S. Application Data

(60) Provisional application No. 62/408,946, filed on Oct. 17, 2016, provisional application No. 62/335,124, filed on May 12, 2016.

(51) Int. Cl.
*G06F 19/00*    (2018.01)
*G06Q 10/08*    (2012.01)
(Continued)

(52) U.S. Cl.
CPC ............. *G06Q 10/087* (2013.01); *G06K 7/12* (2013.01); *G06K 19/0614* (2013.01); *G06K 19/07758* (2013.01)

(58) Field of Classification Search
CPC .. G06Q 10/087; G06Q 10/0875; G06Q 20/20; G07G 1/0045; G07G 1/0081
(Continued)

(56) References Cited

U.S. PATENT DOCUMENTS 4,929,818 A    5/1990    Bradbury et al.
6,245,778 B1    6/2001    Hadley et al.
(Continued)

FOREIGN PATENT DOCUMENTS

EP    3159829 A1    4/2017
WO    2015054188    4/2015

OTHER PUBLICATIONS

Extended European Search Report dated Sep. 29, 2017 for EP Application No. 1710201.2-1871.

*Primary Examiner* — Daniel St Cyr
(74) *Attorney, Agent, or Firm* — Buchanan Ingersoll & Rooney PC

(57) ABSTRACT

Embodiments of the system can relate to information tracking of items and/or other objects associated with the items. Some embodiments can include information tracking of the use of the items and/or objects. Some embodiments can include the use of markers associated with the items. At least one of the markers may be modifiable. In at least one embodiment, a marker can be configured to generate a certain detectable property (e.g., emit a signal, have a certain pattern, have a certain color, have a certain magnetic property, etc.). During use of the item and/or object associated with the item, the marker can be used to generate tracking information. Upon changing its detectable property, the marker can be caused to generate different and/or additional tracking information.

23 Claims, 11 Drawing Sheets

(51) Int. Cl.
*G06K 7/12* (2006.01)
*G06K 19/06* (2006.01)
*G06K 19/077* (2006.01)

(58) Field of Classification Search
USPC .............. 235/385, 383, 380, 462.01, 462.46, 235/472.02
See application file for complete search history.

(56) References Cited

U.S. PATENT DOCUMENTS

| | | | |
|---|---|---|---|
| 6,378,906 B1 | 4/2002 | Pennaz | |
| 6,456,729 B1 | 9/2002 | Moore et al. | |
| 7,439,859 B2 | 10/2008 | Humphrey | |
| 7,617,850 B1 | 11/2009 | Dorney | |
| 7,845,375 B2 | 12/2010 | Dorney | |
| 8,127,805 B2 | 3/2012 | Dorney | |
| 8,151,832 B1 | 4/2012 | Dorney | |
| 8,245,739 B1 | 8/2012 | Wade et al. | |
| 8,408,255 B1 | 4/2013 | Wade et al. | |
| 8,954,347 B1 * | 2/2015 | Einfalt | G06Q 10/087 340/613 |
| 2003/0051767 A1 | 3/2003 | Coccaro et al. | |
| 2003/0069813 A1 * | 4/2003 | Burk | G06Q 10/06 705/28 |
| 2006/0238346 A1 * | 10/2006 | Teller | B67D 3/0077 340/572.1 |
| 2007/0048084 A1 | 3/2007 | Jung et al. | |
| 2007/0187266 A1 | 8/2007 | Porter et al. | |
| 2012/0145778 A1 * | 6/2012 | Cong | G16H 10/40 235/375 |

* cited by examiner

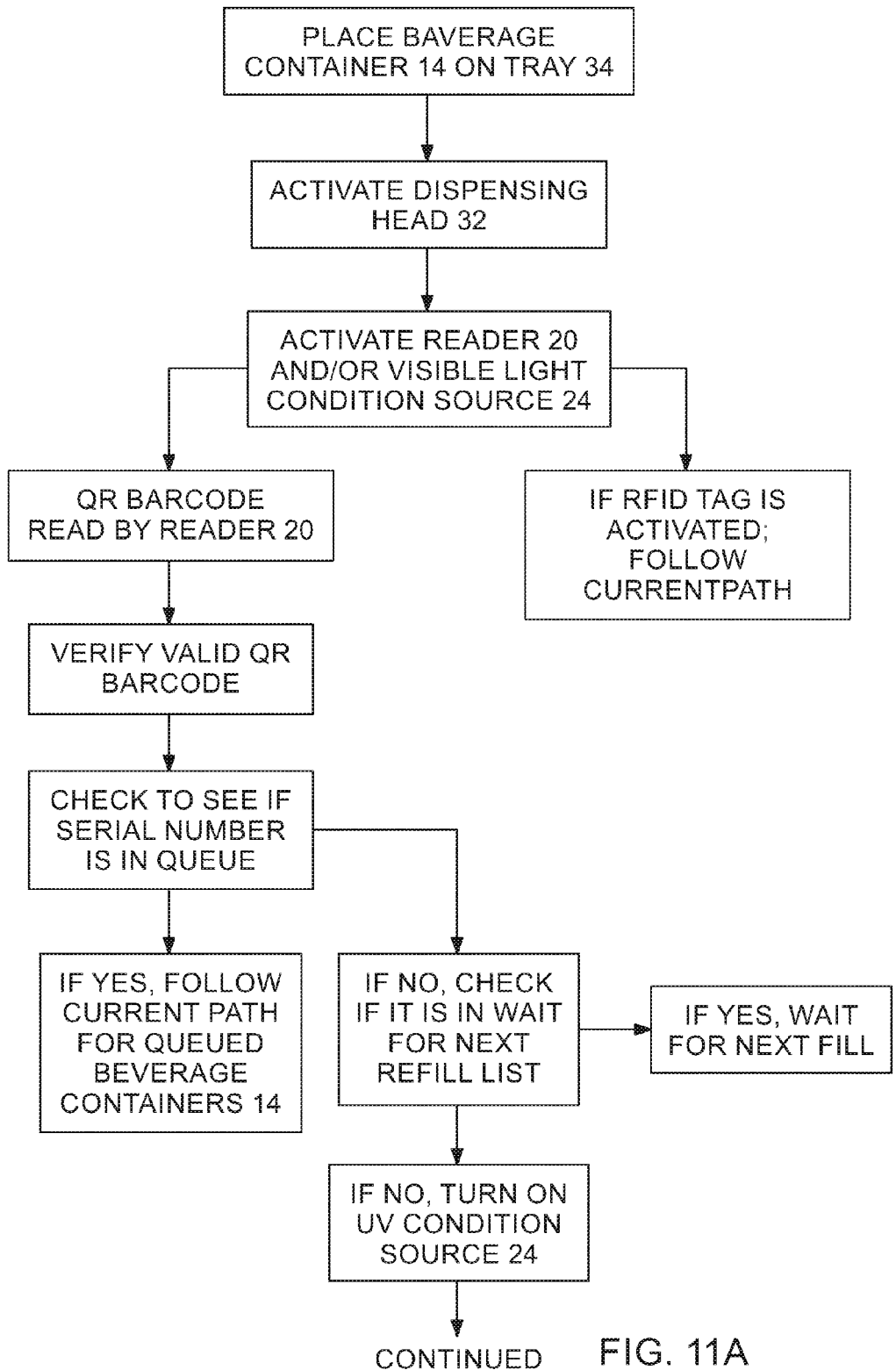

INFORMATION AND TRACKING MARKING SYSTEM AND METHOD WITH MODIFIABLE MARKS

CROSS-REFERENCE TO RELATED APPLICATIONS

This patent application is related to and claims the benefit of U.S. Provisional Application Ser. No. 62/335,124, filed May 12, 2016, and U.S. Provisional Application Ser. No. 62/408,946, filed Oct. 17, 2016, and the entire contents of each of those applications are incorporated herein by reference.

FIELD OF THE INVENTION

Embodiments of the invention can relate to tracking items using markers to generate tracking information. Some embodiments can include use of modifiable markers to generate additional tracking information.

BACKGROUND OF THE INVENTION

Inventory management, supply chain management, and/or quality assurance management can include use of markings, such as serial numbers and identification codes to assist with identifying an aspect of an item. The markings may have a certain pattern or may be encoded with certain information that can be detected for identification purposes. Yet, conventional systems consist of static markings that have pre-defined identification data. Once the marking is placed on the item, the marking will always generate the same pre-defined identification data.

Some conventional systems may include use of programmable processors (e.g., Radio Frequency Identification ("RFID") tags) as markings. These may be programmed and re-programmed to generate configurable signals. However, use of RFID technology may not always feasible. For example, it may be too costly, require use of expensive equipment, and/or require users having particular expertise in RF technology. Further, it may be desirable for some systems to include use of disposable items (e.g., disposable beverage containers). Yet, tracking disposable items with RFID tags can further add to the costs of the tracking system.

SUMMARY OF THE INVENTION

Embodiments of the system can relate to information tracking of items and/or other objects associated with the items. This may include information tracking of the use of the items and/or objects. Some embodiments can include the use of markers. At least one of the markers may be modifiable. For example, a marker can be configured to generate a certain detectable property (e.g., emit a signal, have a pattern, have a color, have a magnetic property, etc.). The marker may be attached to, or otherwise associated with, the item. During use of the item and/or object associated with the item, the marker can be used to generate tracking information. The tracking information can be used to identify, track, and/or monitor the item and/or the object. Some embodiments can include the use of the modifiable markers, where the system modifies the markers. This can include changing at least one of the marker's detectable properties. Upon changing its detectable property, the marker can be caused to generate different and/or additional tracking information. The different and/or additional tracking information may be used to further identify, track, and/or monitor the item and/or the object.

It is contemplated for the disclosed system and method to be used for identifying, tracking, and/or monitoring beverage containers and/or beverage dispensed therein. The beverage may be dispensed from a beverage dispensing apparatus. However, some embodiments may be used for other forms of tracking. These can include tracking of other types of products and/or utilizing any of the system components for other types of tracking schemes, document management, process management, quality assurance management, etc.

In some embodiments, the system can be easily incorporated into a new dispensing apparatus at the time of manufacturing the new dispensing apparatus. Some embodiments of the system can facilitate retrofitting and/or incorporating the components of the system into an existing dispensing apparatus. For example, the system can be integrated into an existing dispensing apparatus as a retrofitting kit, or part of a retrofitting kit. The existing dispensing apparatus may include some form of information tracking technology. Thus, the system may be used to augment and/or replace the information tracking technology of the existing dispensing apparatus. The systems and methods disclosed herein can be further configured so that no degradation and/or interference with data tracking advantages exhibited by the existing dispensing apparatus will occur upon incorporation of any component of the inventive system into an existing tracking system of the existing dispensing apparatus.

Some aspects of the system can be used to provide lower cost alternatives for controlling dispensing of beverage. This can include controlling dispensing of beverage into disposable beverage containers. The system can also provide for seamlessly tracking and dispensing of beverage that can be done without using cards, without a verification medium, without necessitating an Internet connection, and/or without causing any other type of interruption, hindrance, and/or bottleneck to the automated beverage dispensing process. Some embodiments can be used to generate a tracking system that can promote sustainability (e.g., business sustainability, environmental sustainability, etc.). Any of these benefits can be used to meet demands of customers, which may include quick service restaurants. For example, conventional systems may use RFID technology, which can promote sustainability by avoiding the use of disposable containers. Embodiments of the inventive system and method can still perform this operation (e.g., by using a refillable beverage container). Yet, an additional sustainability advantage provided by the inventive system and method can be due to the use of ink instead of RFID technology. Use of ink can allow for the recycling of a disposable beverage container (e.g., recycling a paper cup). Using RFID technology with a paper cup can be more difficult to recycle, and may even cause the paper cup to not be recyclable at all. For example, with some governmental regulatory agencies (e.g., Europe's WEE2020 standard), the RFID may need to be separated from the cup prior to disposal. This can add cost and labor to the disposal and/or recycling process.

The component parts of some embodiments of the system can be easily retrofitted into existing dispensing apparatuses. Thus, the system can facilitate conversion of a dispensing apparatus that has no tracking mechanisms to a dispensing apparatus that can perform tracking. This can be achieved easily and effectively by simple inclusion of component parts into portions of the dispensing apparatus that may already be suited for such components.

Some existing dispensing apparatuses may include conventional tracking systems. Retrofitting such dispensing apparatus can allow the inventive tracking system to augment the conventional tracking system. This can include allowing the conventional tracking system to remain relatively unchanged. This may improve speed to market for systems that are intended for such configurations. Whether produced as a new dispensing apparatus or retrofitting an existing dispensing apparatus, the inventive system and method can minimize manufacturing changes to manufacturing processes that are already in use and that may be used to produce the new beverage dispensing apparatuses and/or component parts for retrofitting.

In an exemplary embodiment, a tracking device can include at least one marker configured to be associated with an item. The at least one marker can have at least one property. The at least one property can be identifiable to generate first tracking information. The at least one property can be modifiable. The at least one modified property can be identifiable to generate second tracking information. The first tracking information and the second tracking information can be used to identify, track, and/or monitor at least one attribute of the item and/or use of the item. In some embodiments, the item can be associated with an object. In some embodiments, the item can include at least one of a beverage cup and a token. In some embodiments, the object can include a beverage. In some embodiments, the first tracking information and the second tracking information can be used to identify, track, and/or monitor at least one attribute of the item, at least one attribute of the object, at least one use of the item, and/or at least one use of the object.

In some embodiments, the at least one modified property can be further modifiable. In some embodiments, the at least one property and/or the at least one modified property can include at least one of a physical property, a chemical property, an optical property, a magnetic property, an electrical property, a programmed code, a readable property, a non-readable property, a pattern, and a disappearing property. In some embodiments, the at least one property and/or the at least one modified property can be modifiable due to the at least one marker being subject to at least one condition. In some embodiments, being subject to the at least one condition can include at least one of exposure to the at least one condition and removal from exposure to the at least one condition. In some embodiments, the at least one condition can include at least one of electromagnetic radiation, an electric field, a magnetic field, a chemical, heat energy, pressure, acoustic energy, and physical contact. In some embodiments, the at least one condition can include at least one of magnitude, intensity, rate of change, frequency, and vector direction of the at least one condition. In some embodiments, the at least one property and/or the at least one modified property can be modified by at least one of changing all at once, changing incrementally, changing as a function with which the at least one marker is subject to the at least one condition, and changing as a function of time. In some embodiments, the at least one property and/or the at least one modified property can be modified by at least one of changing as a function of intensity, rate, and frequency with which the at least one condition occurs. In some embodiments, the at least one property can include a plurality of properties and/or the at least one modified property comprises a plurality of modified properties. In some embodiments, a plurality of conditions can generate a single change in a single property and/or a single change in a single modified property. In some embodiments, a single condition can generate a change in a plurality of properties and/or a change in a plurality of modified properties. In some embodiments, the at least one property and/or the at least one modified property can be identifiable and/or not identifiable by a reader. In some embodiments, the at least one property and the at least one modified property can generate at least one readable state and/or at least one non-readable state.

In another exemplary embodiment, an item for a tracking system can include at least one item. At least marker can be associated with the at least one item. The at least one marker can have at least one property. The at least one property can be identifiable to generate first tracking information. The at least one property can modifiable. The at least one modified property can be identifiable to generate second tracking information. The first tracking information and the second tracking information can be used to identify, track, and/or monitor at least one attribute of the at least one item and/or use of the at least one item.

In another exemplary embodiment, a tracking system can include at least one marker associated with an item. The at least one marker can have at least one property. The at least one property can be identifiable to generate first tracking information. The at least one property can be modifiable. The at least one modified property can be identifiable to generate second tracking information. The at least one property and/or the at least one modified property can be modifiable due to the at least one marker being subject to at least one condition. The system may further include at least one reader configured to capture the first tracking information and/or the second tracking information. The system may further include at least one condition source configured to subject the at least one marker to the at least one condition. The system may further include at least one processor configured to receive and process the first tracking information and/or the second tracking information to identify, track, and/or monitor at least one attribute of the item and/or use of the item. In some embodiments, the system can further include a reset device.

In another exemplary embodiment, a tracking system can include at least one marker associated with a beverage container, the at least one marker having a first property. The first property can be identifiable to generate first tracking information. The first property can be modifiable to generate a second property. Then second property can be identifiable to generate second tracking information. The first property and/or the second property can be further modifiable due to the at least one marker being subject to at least one condition. The system can further include at least one reader configured to capture the first tracking information and/or the second tracking information. The system can further include at least one condition source configured to subject the at least one marker to the at least one condition. The system can further include at least one processor configured to receive and process the first tracking information and/or the second tracking information to identify, track, and/or monitor at least one attribute of the beverage container and/or use of the beverage container. The system can further include a reset device configured to cause the at least one marker to modify from the second property to the first property. In some embodiments the reset device can be part of a dishwasher. In some embodiments, the dishwasher can be configured to receive the beverage container, subject the beverage container to at least one of a wash cycle, a sanitize cycle, and/or a rinse cycle. In some embodiments, the reset device may cause the at least one marker of the beverage container to modify from the second property to the first property. This can be done before the beverage container exits the dishwasher.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings identify like components:

FIGS. 11A-11B show an exemplary process flow that may be used for carrying out an embodiment of the inventive method. FIG. 11B is a continuation of FIG. 11A.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1A:
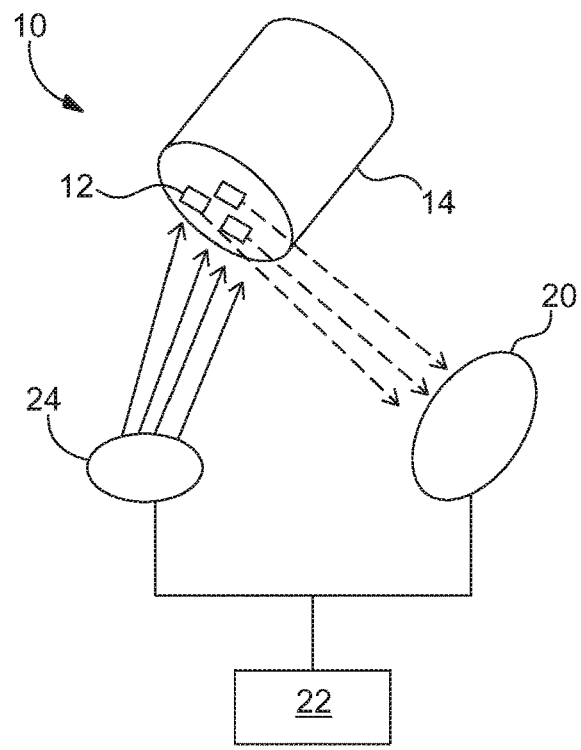
FIG. 1A is an embodiment of the system including an embodiment of a beverage container with markers.
Figure 1B:
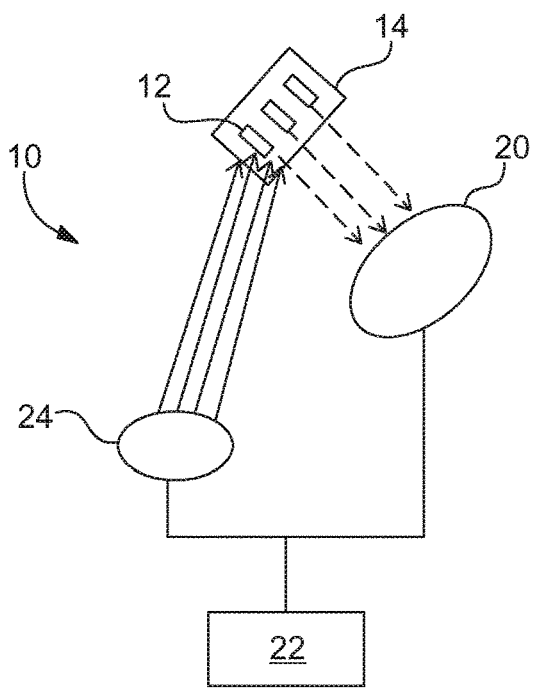
FIG. 1B is an embodiment of the system including an embodiment of a token with markers.

Referring to FIGS. 1A-1B, the system 10 can include at least one marker 12. The marker 12 may be associated with an item 14. Being associated with can include being placed in, placed on, physically attached to, chemically bonded to, in electrical connection with, in wireless communication with, or otherwise coupled to the item 14. The marker 12 can be used to identify, track, and/or monitor an item 14 and/or an object 16 associated with the item 14. For example, the item 14 may be a beverage container. The object 16 may be beverage being dispensed within the beverage container, beverage consumed from the beverage container, etc.

The identifying, tracking, and/or monitoring can include identifying, tracking, and/or monitoring at least one attribute or characteristic of the item 14 and/or object 16. For example, an attribute or characteristic can include the type of beverage, the amount of beverage, the frequency the beverage is dispensed, a quality of the beverage (e.g., calorie content, color, sugar content, caffeine content, alcohol content, etc.), the amount paid for the beverage, the type of payment used, the time and date of dispensement of beverage, the location the dispensement of beverage occurred, the dispensing apparatus 18 (see FIG. 4) that dispensed the beverage, the beverage container size, the beverage container type, etc.

The marker 12 can include an information-bearing mark. This can include paint, ink, barcode, fluorescent pigment, magnetic strip material, condition-response smart material, embossed material, imprinted material, Radio Frequency Identification ("RFID") tag (active or passive), etc. The marker 12 can be embedded within the item 14, printed on the item 14, written as code on the item 14, attached as a film on the item 14, etc. Any one type or a combination of types of markers 12 can be used. The marker 12 can be configured to exhibit a certain detectable property (e.g., have a certain shape, have a certain thickness, have a certain pattern, emit a certain wavelength, generate a certain chemical response, emit a certain signal, have a certain temperature, exhibit a certain optical, magnetic, and/or mechanical property, etc.). This detectable property can be used as information for identifying, tracking, and/or monitoring the item 14 and/or object 16. For example, the marker 12 may be configured to be readable by a reader 20. In some embodiments, the information contained within the marker 12 can be acquisitioned by a reader 20.

Some markers 12 can be set with defined property so that the information obtained therefrom is not changed (e.g., a marker 12 can emit a certain wavelength of light at all times). These may be referred to as non-modifiable markers 12. Some markers 12 can be programmable and/or re-programmable with the information (e.g., a marker 12 can be readable and writable RFID tag ("read-write RFID tag"), magnetic strip, holographic mark, etc.). Some markers 12 can be configurable and/or re-configurable to generate a desired type of information (e.g., a marker 12 can be a condition-response smart material that emits light at a first wavelength under one condition and/or a second wavelength of light under a different condition). These may be referred to as modifiable markers 12. For example, the marker 12 can be a mark that experiences a change in property when subjected to a condition. The property can include physical property, chemical property, optical property, magnetic property, electrical property, a programmed code, a certain pattern, holographic image, etc. Other properties can include being readable by the reader 20, being non-readable by the reader 20, disappearing (e.g., degrade, deteriorate, and/or disintegrate) upon being subject to the condition, etc. Being subjected to a condition can include exposure to the condition and/or removal from exposure to the condition. The condition can include electromagnetic radiation, an electric field, a magnetic field, a chemical, heat energy, pressure, acoustic energy, physical contact, etc. A condition can further include magnitude, intensity, rate of change, frequency, vector direction, etc. of any of the conditions identified herein. A marker 12 may be configured to change in property due to one or combination of conditions.

The property of the marker 12 can be made to change all at once, incrementally, as a function with which the marker 12 is subject to the condition, etc. The property of marker 12 can be made to change as a function of another parameter, such as time for example. The change in the property can be instantaneous or over a predetermined period of time. For instance, the change in the property can be incrementally, but each incremental change can occur instantaneously or over a predetermined period of time. Further, the change in the property can be a function of the intensity, rate, frequency with which the condition occurs, etc. In some embodiments, the change can include the marker 12 changing from a first property to a second property upon being subject to the condition. The marker 12 can further change from the second property to a third property upon being subjected to the same and/or different condition.

The marker 12 experiencing a first condition only once may cause the marker 12 to change from the first property, to the second property, and then to the third property. Alternatively, the marker 12 may be configured to change in iterations. For example, the marker 12 can change from the first property to the third property in iterations due to successive subjection to the condition. For instance, the marker 12 experiencing a first condition may cause the marker 12 to change from the first property to the second property. The marker 12 may stay at the second property until it experiences another condition. The marker 12 experiencing the first condition again and/or a second condition may cause the marker 12 to change from the second property to the third property.

Any other combination and/or permutation of transitions from a property to another property can be achieved. For example, the marker 12 may change from the second property back to the first property upon experiencing the condition. The marker 12 can change from the third property back to the second property and/or the first property upon experiencing the condition. The marker 12 can change from the first property to the third property upon experiencing the condition. The marker 12 may include more or less property transitions. For example, a marker 12 may include only a first property and a second property to and from which the marker 12 can transition. As another example, the marker may include any number of properties to and from which the marker 12 can transition.

In some embodiments, a plurality of conditions can be used to generate any one or multiple of properties. For example, the first condition and the third condition may cause the marker 12 to change from the first property to the second property. Some embodiments may require a plurality of conditions to effectuate the change. Some embodiments may not require a plurality of conditions, but only permit the plurality of conditions to cause the change.

In some embodiments, any one or a plurality of properties can be generated by a single condition. For example, the first condition may cause the marker 12 to change from the first property to the second and third properties. Some embodiments may require the second and third properties to be effectuated by the first condition. Some embodiments may not require the second and third properties to occur in response to the first condition, but only permit the second and third properties to occur.

As noted above, the marker 12 can be configured to change from being readable to non-readable. This can include changing from a first readable state to a second readable state then to a non-readable state, for example. The change from the first readable state can be caused by the marker 12 being subjected to a first condition. This can include causing the marker 12 to change from the first readable state to the second readable state. The change from the second readable state can be caused by the marker 12 being subjected to a second condition. This can include causing the marker 12 to change from the second readable state to the non-readable state. The second condition can be the same as or different from the first condition.

It contemplated that more or less intermediate readable states can exist between the first readable state and the non-readable state. For example, there may be no intermediary readable states at all (e.g., the marker 12 can be configured to change from a readable state to a non-readable state). As another example, there may be a third readable state, a fourth readable state, etc. It is also contemplated for some markers 12 to also be able to change from a non-readable state to a readable state. It is further contemplated for some markers 12 to be able to change from a readable state to a non-readable state and also from a non-readable state to a readable state. Thus, while examples herein may describe a marker 12 changing from a readable state to non-readable state, the description thereof can be equally applicable to the marker 12 changing from a non-readable state to a readable state.

In some embodiments, any one of the readable states and/or non-readable states can be generated by a separate condition. As a non-limiting example, a marker 12 may have four readable states and one non-readable state. A first condition may cause the marker 12 to change from the first readable state to the second readable state. A second condition may cause the marker 12 to change from the second readable state to the third readable state. A third condition may cause the marker 12 to change from the third readable state to the fourth readable state. A fourth condition may cause the marker 12 to change from the fourth readable state to the non-readable state. Any one of the first, second, third, and/or fourth conditions can be the same or different from another one. The transition trough the readable states can be linear or in successive order (e.g., the marker 12 may be configured to transition from the first readable state, then to the second readable state, then to the third readable state, then to the fourth readable state, then to the non-readable state). The transition trough the readable states can be non-linear or not in successive order. For example, the marker 12 may be caused to change from the first readable state to the fourth readable state. As another example, the marker 12 can be caused to change from the third readable state to the first readable state.

In some embodiments, a plurality of conditions can be used to generate any one or a multiple of the readable states and/or the non-readable states. For example, the first condition and the third condition may cause the marker 12 to change from the first readable state to the second readable state. Some embodiments may require a plurality of conditions to effectuate the change. Some embodiments may not require a plurality of conditions, but only permit the plurality of conditions to cause the change.

In some embodiments, a plurality of readable states and/or non-readable states can be generated by a single condition. For example, the first condition may cause the marker 12 to change from the first readable state to the second and the third readable states. Some embodiments may require the second and third readable states to be effectuated by the first condition. Some embodiments may not require the second and third readable stated to occur in response to the first condition, but only permit the second and third readable states to occur.

The readable or non-readable states can be defined by the properties of the marker 12. For example, the first readable state can be defined by a first wavelength of light the marker 12 emits. This may allow the marker 12 to be read by a first reader 20. Upon being subjected to the first condition, the marker 12 may then be caused to exhibit a certain magnetic property. This may define the second readable state. The second readable state may be a readable state or a non-readable state. For example, this may allow the marker 12 to be read by a second reader 20 or it may prevent it from being read by the second reader 20. Upon being subjected to the third condition, the marker 12 may then be caused to emit a second wavelength of light. This may define the third readable state. The third readable state may be a readable state or a non-readable state. For example, this may allow the marker 12 to be read by, or prevent the marker 12 from being read by, a third reader 20 and/or the first reader 20.

Some readable states can be defined by the marker 12 being able to be read by any one or any combination of readers 20. For example, the second readable state may be defined by the first and the second readers 20 being able to read the marker 12. Some embodiments may require the first and second reader 20 being able to read the marker 12 to define the second readable state. Some embodiments may not require the first and second reader 20 being able to read the marker 12 to define the second readable state, but define the second readable state by the fact that the first and second readers 20 can read the marker 12. Some non-readable states can be defined by the marker 12 not being able to be read by any one or any combination of readers 20. For example, the non-readable state may be defined by the first and the second readers 20 not being able to read the marker 12. Some embodiments may require the first and second reader 20 not being able to read the marker 12 to define the non-readable state. Some embodiments may not require the first and second reader 20 not being able to read the marker 12 to define the non-readable state, but define the non-readable state by the fact that the first and second readers may not be able read the marker 12.

The system 10 can further include at least one reader 20. The reader 20 can be configured to capture the information stored within, being emitted from, or otherwise encompassed by the marker 12. The reader 20 can be a scanner, a camera or some other imaging device, a charge-coupled device, an ultrasonic transducer array, magnetic strip reader, a photodetector array, and/or or some other sensing means. The reader 20 may further include at least one processor 22. In some embodiments, the processor 22 can be separate from the reader 20. The processor 22 may be in electrical communication with the reader 20 and/or a marker 12. This can include a hardwire connection and/or a wireless connection. Any of the wireless connections disclosed herein can be achieved by at least one component having a transceiver unit configured to facilitate wireless communication. For example, the processor 22 and the reader 20 may each have a transceiver unit.

Figure 2:
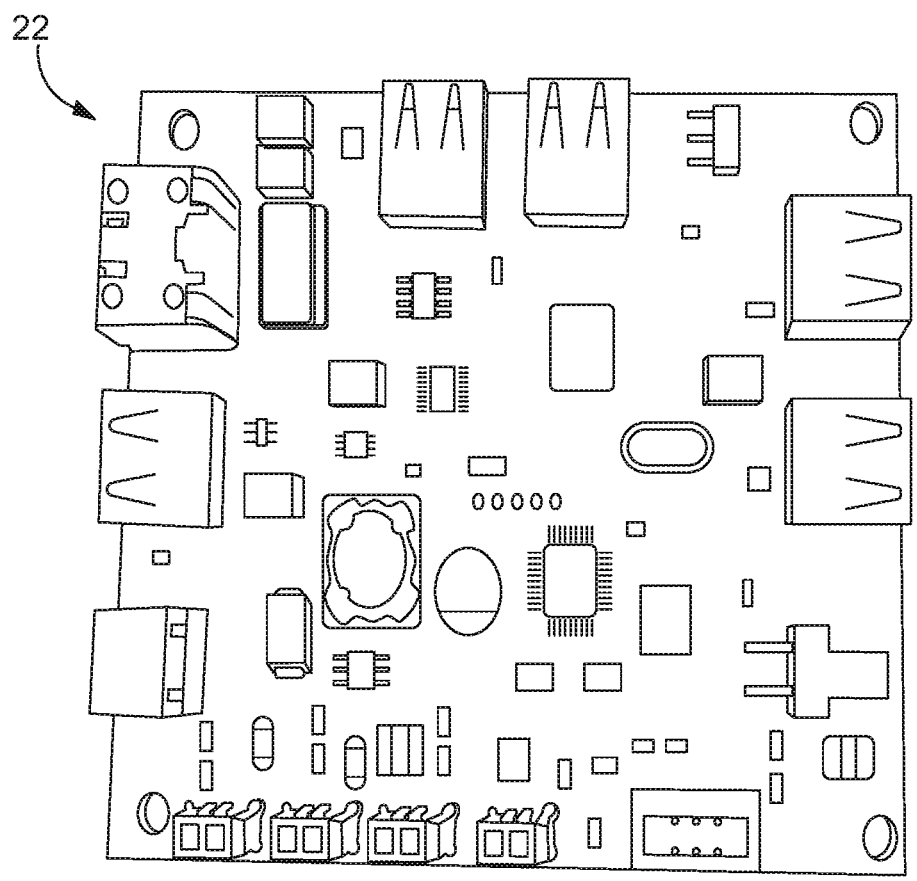
FIG. 2 is an embodiment of a processor that may be used with the system.

Referring to FIG. 2, the processor 22 can include a processing unit operatively associated with a non-transitory, nonvolatile memory. The processor 22 can be a microprocessor, a microchip, a controller (e.g., a programmable logic controller), an input/output control board, etc. The processor 22 can include programmable software. The programmable software may be stored in the memory. Some embodiments can include a plurality of processors 22. The plurality of processors 22 may be configured to form a computer system. For example, the plurality of processors 22 may be in communication with each other to form a computer network.

The computer system may include at least one database. The computer system may further include at least one server. Modems, gateways, communication interfaces, etc. may be used to facilitate communication between any components of the computer system and/or facilitate coordinated transfer of data between any component of the computer system. At least one of the processors 22 can be a computer device (e.g., a desktop, laptop, tablet, cellphone, mobile electronic device, etc.). The computer device may be configured to generate a user interface ("UI"). The UI may be used by a user to interact with the system 10, issue commands to any of the processors 22, program and reprogram any of the processors 22, acquisition data from any of the processors 22, etc. The computer device can transmit and/or receive data from the processor 22. The computer device can further digitize, store, configure, and/or manipulate the data received by the processor 22. The UI may be configured to facilitate identifying, tracking, and/or monitoring of the item 14 and/or object 16 via the computer device.

Any of the processors 22 disclosed herein can be in electro-mechanical connection with any system 10 component. For example, any processor can be in electro-mechanical connection with any of the dispensing apparatuses 18, readers 20, reset devices 36, condition sources 24, printers 42, and/or any other system 10 component. This may allow the processor 22 to cause the component to perform a certain way. This can be achieved, for example, via application programming interface (API) software.

In some embodiments, the processor 22 can be programmed to receive tracking information from the marker 12 and/or the reader 20. The processor 22 can be further programmed to digitize, store, configure, and/or manipulate the tracking information. The processor 22 may be further programmed to transmit data to the reader 20 and/or to a marker 12. This data may be data that was transmitted to the processor 22 by the computer device. In some embodiments, the data can be transmitted first to the reader 20 and then to the marker 12. In some embodiments, the data can be transmitted first to the marker 12 and then to the reader 20. In some embodiments, the data can be transmitted to the reader 20, whereby the reader transmits the data, or at least a portion of it, to the marker 12. In some embodiments, the data can be transmitted to the marker 12, whereby the marker 12 transmits the data, or at least a portion of it, to the reader 20. The data transmitted to the reader 20 and/or marker 12 can cause the reader 20 and/or marker 12 to perform in a certain way.

Referring back to FIGS. 1A-1B, the system 10 can further include at least one condition source 24. The condition source 24 can be a device that generates the condition, removes the condition, obfuscates the condition, attenuates the condition, amplifies the condition, filters the condition, interferes with the condition, etc. The condition source 24 can be an RF emitter, electromagnetic radiation emitter, light emitting device, a laser, a light emitting diode ("LED"), a heat generator, a heat sink, an electric field generator, a magnetic field generator, an ultrasound generator, a vibrational device, ultraviolet ("UV") generator, infrared ("IR") generator, an acoustic generator, a filter, an amplifier, etc. In some embodiments, the condition source 24 can be part of the reader 20. In some embodiments, the condition source 24 can be separate from the reader 20. The condition source 24 may be in electrical communication with the processor 22. This may include being in wireless communication with the processor 22. The processor 22 can be programmed to cause the condition source 24 to activate and/or deactivate. There can be more than one condition source 24. Any one condition source 24 can be the same as or different from another condition source 24. Any one condition source 24 can be configured to generate more than one condition.

Figure 3:
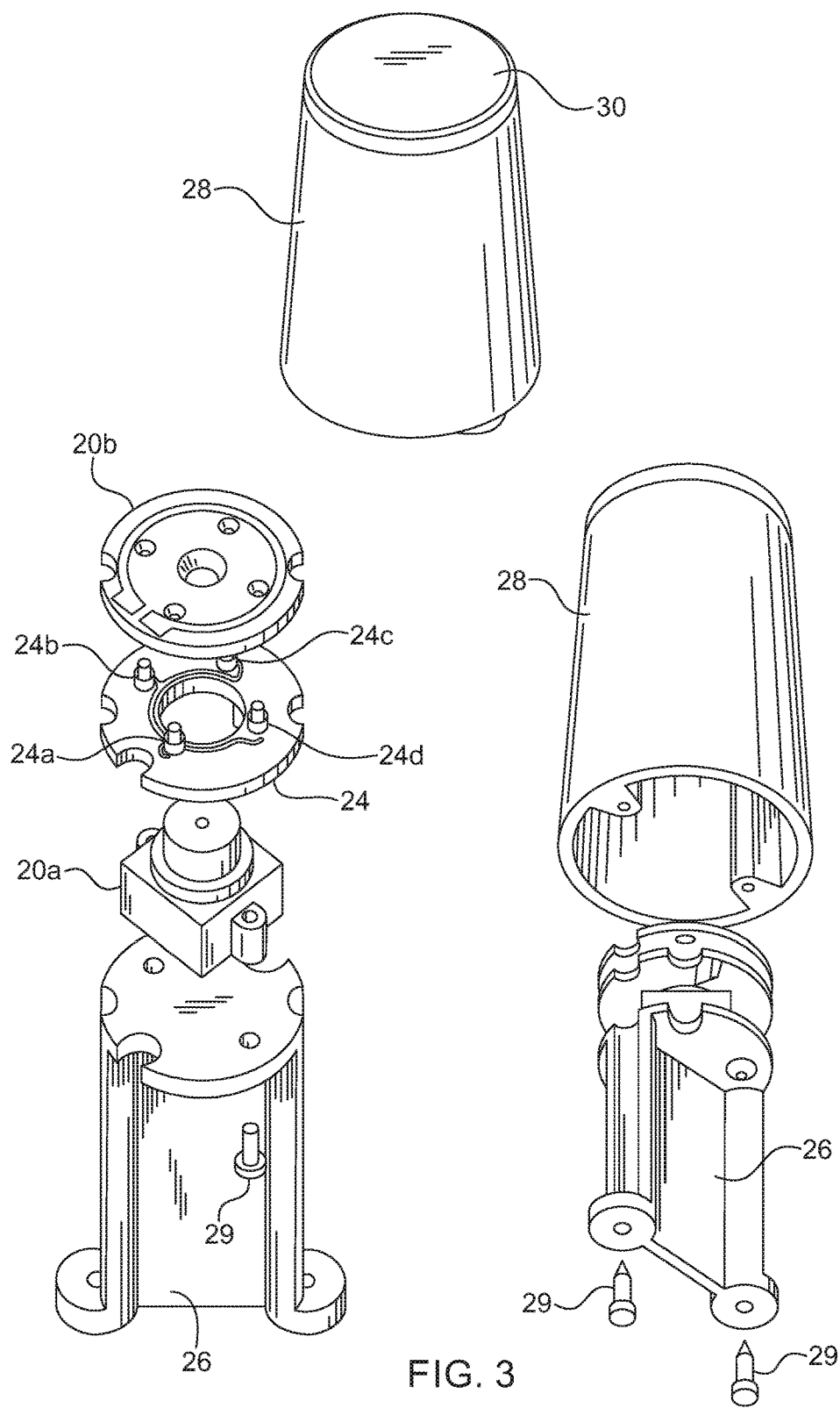
FIG. 3 is an embodiment of a reader and condition source that may be used with the system.

Referring to FIG. 3, some embodiments can include a combined reader 20 and condition source 24. FIG. 3 shows an exemplary configuration of a combined reader 20 and condition source 24. Some embodiments may include a base 26. At least one reader 20 may be placed on the base 26. This may include securing any one reader 20 to the base 26. FIG. 3 shows, as an example, an optical camera 20a and an RFID antenna 20b as two readers 20 being attached to the base 26. The optical camera 20a may be a wide angle camera, for example. The RFID antenna 20b may be an ultra-high frequency radio frequency antenna. At least one condition source 24 may also be placed on the base 26. This may include securing any one condition source 24 to the base 26. In addition, or in the alternative, any one of the readers 20 and/or condition sources 24 can be secured to another reader 20 and/or condition source 24. FIG. 3 shows, as an example, a printed circuit board ("PCB") as a condition source 24. The PCB can include at least one light emitter (e.g., LED). For example, the PCB can include a UV LED 24a (e.g., operating at or near 300 nm), a visible light LED 24b (e.g., operating at or near 500 nm), a first IR LED 24c (e.g., operating at or near 800 nm), and/or a second IR LED 24d (e.g., operating at or near 1100 nm).

At least one fastener 29 (e.g., a screw) may be used to secure any component to the base 26. The base 26 may be configured to be slidably received within a housing 28. The housing 28 may be secured to the base 26. This may be achieved via at least one fastener 29. The housing 28 may be configured to protect any component attached to the base 26. This may include covering and/or concealing the components. This may include protecting the components from being damaged from beverage 16, for example. The housing 28 may further include a window 30. The window 30 may include a lens. The window 30 can be configured facilitate passage of the condition (e.g., radiation, electromagnetic waves, heat, etc.) from the condition source 24 that may be attached to the base 26. The window 30 may also facilitate passage of any response to the condition from the marker 12 and/or detectable property of the marker 12.

The processor 22 may cause data to be the transmitted to the marker 12, the reader 20, and/or the condition source 24. The processor 22 can cause the system 10 to change the property of the marker 12. This may include re-programming the marker 12 (e.g., an RFID tag marker 12), causing the condition source 24 to generate a condition, etc. In some embodiments, the processor 22 may cause the marker 12 to "re-set". This may include re-setting the marker 12 for repeated used. The re-set may be used to cause the marker 12 to change back to its initial property or to a property that is different from the initial property. For example, a first condition source 24 can be configured to generate a first condition. The first condition can cause the marker 12 to change from a first property to a second property. The processor 22 can cause the first condition source 24 to generate a second condition and/or cause a second condition source 24 to generate the second condition. The second condition can cause the marker 12 to change from the second property back to the first property. This may be done to "re-set" the marker 12. As another example, the second condition can cause the marker 12 to change from the second property to a third property. The third property may be the "re-set" for the marker 12. Re-setting the marker 12 can include reprogramming the marker 12.

Figure 4:
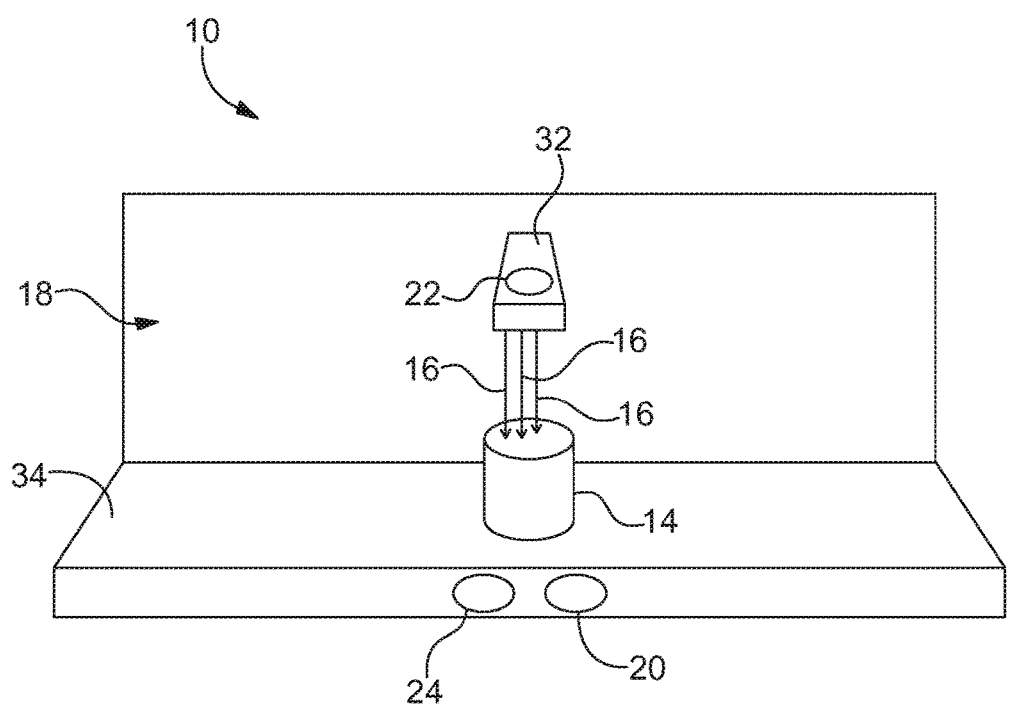
FIG. 4 is an embodiment of the system including a dispensing apparatus.

Referring to FIG. 4, the system 10 can include a dispensing apparatus 18. In some embodiments, the dispensing apparatus 18 may be part of the system 10. In some embodiments, the system 10 can be in electrical communication with the dispensing apparatus 18. This can include wireless communication. The dispensing apparatus 18 can be configured to dispense beverage (e.g., the object 16) into a beverage container (e.g., the item 14). Some dispensing apparatuses 18 may include actuators in electro-mechanical communication with dispensing heads 32 and dispensing valves to dispense beverage therefrom. Some dispensing apparatuses 18 can include use of RFID writers, read-write RFID tags, RFID readers, display screens, sensors, and controllers, etc. Any or all of these components can be in communication with each other to effectuate automatic dispensement and tracking of beverage. Some dispensing apparatuses 18 can include methods and features for RFID encoding RFID tags. These RFID tags may be associated with the beverage container and/or the dispensing apparatus 18. Information obtained from the read-write RFID tags may be used to facilitate coordinating dispensement of beverage.

Some dispensing apparatuses 18 may be configured to sense proximity of beverage containers. This may be done to control functioning of dispensing valves and/or dispensing heads 32 of the dispensing apparatus 18. Controlling the function may be done via a processor 22. The processor 22 may be in electrical communication with the dispensing apparatus 18. This may include being in wireless communication. Communications via the processor 22 may be used to authorize a fill (e.g., beverage being dispensed into the beverage container from the dispensing apparatus 18) and/or or refill a beverage container.

Some dispensing apparatuses 18 can include features for tracking a quantity of beverage dispensed and/or a quantity of beverage remaining to be dispensed based on a purchased amount of beverage.

The components and methods of use for the operation of these and other embodiments of dispensing apparatuses 18 can be found within the U.S. Pat. Nos. 7,439,859; 8,127,805; 8,130,083; 8,408,235; and 9,334,149, the disclosures of each of which are incorporated herein by reference in their entireties.

Any of the readers 20, condition sources 24, and/or processors 22 can be part of the dispensing apparatus 18. In some embodiments, any of the readers 20, condition sources 24, and/or processors 22 may be separate from the dispensing apparatus 18 but be in electrical communication with the dispensing apparatus 18. This can include being in wireless communication. In some embodiments, the processor 22 can be configured to manage readers 20 and/or control condition sources 24 that may be included with the dispensing apparatus 18. In some embodiments, the processor 22 can be configured to allow a single Universal Serial Bus to interface with the processor 22.

In at least one embodiment, the dispensing apparatus 18 can include at least one dispensing head 32. The dispensing head 32 may be configured to dispense a predetermined amount of beverage 16. The predetermined amount can depend on the volume of the beverage container 14, the amount of beverage 16 paid for by a user, the amount of calorie content of the beverage 16 to be dispensed, the amount of sugar content of the beverage 16 to be dispensed, the amount of alcohol content of the beverage 16 to be dispensed, etc. For example, it is contemplated for a user to purchase a certain amount of beverage 16. The predetermined amount may be recorded by a processor 22 of the system 10. A user can be given a beverage container 14 upon purchasing the beverage 16 amount. The beverage container 14 can be associated with a marker 12. The marker 12 and the amount of beverage 16 purchased can be associated with each other. The marker information and the amount purchased information can be stored in the processor 22. The dispensing apparatus 18 can be configured to require the user to cause the marker 12 to be in readable-sight of the reader 20 before the dispensing apparatus 18 dispenses the beverage 16. For example, the reader 20 may be in a tray 34 located below the dispensing head 32. The marker 12 may be placed on a bottom of the beverage container 14, for example.

When a beverage container 14 is placed underneath the dispensing head 32, the marker 12 can then be in readable-sight of the reader 20. Upon reading and/or not reading the marker 12, the dispensing apparatus 18 can determine if beverage 16 should be dispensed, how much beverage 16 to dispense, which type of beverage 16 to dispense, etc.

The processor 22 may be programmed to permit or prevent dispensement of beverage 16 into the beverage container 14 and/or into a different beverage container 14. Before, during, and/or after reading the marker 12 information and/or dispensing the beverage 16, any one or a combination of the following may occur:

1. tracking information (e.g., the marker 12 information, the beverage container 14 information, and/or the beverage 16 information) can be processed and/or stored by the processor 22;
2. tracking information can be transmitted from the processor 22 to the computer device;
3. the marker 12 can be modified.

For example, before, during, and/or after reading the marker 12 information and/or dispensing the beverage 16, the processor 22 can cause the condition source 24 to activate and/or de-activate. This may cause a property of the marker 12 to modify. The modification in marker 12 property can result in a change in marker 12 information that may be read by a reader 20. Before, during, and/or after reading the marker 12 information and/or dispensing the beverage 16, the marker 12 information, the beverage container 14 information, and/or the beverage 16 information can be updated. This can include, any changes in marker information, the amount and/or type of beverage 16 dispensed, the amount and/or type of beverage 16 dispensed relative to the amount and/or type of beverage 16 purchased, the beverage container 14 used for reading, the beverage container 14 used to receive the beverage 16, the number of times the beverage container 14 has been used, the number of fills and/or refills that has occurred for the beverage container 14, the time, date, and/or location of dispensement of beverage 16, the amount of calorie content of the beverage 16 dispensed into the beverage container 14 during any one dispensement, the running total amount of calorie content of the beverage 16 dispensed into the beverage container 14, the dispensing apparatus 18 used for dispensement, and/or other statistical information related to the marker 12, the beverage container 14, and/or the beverage 16.

In some embodiments, the system 10 can utilize programming code and/or algorithms to establish a set of rules for controlling how much, when, where, and which type beverage 16, etc. can be dispensed into the beverage container 14. The set of rules can also control proxy values associated with the beverage 16. For example, the set of rules can control the dispensement of beverage 16 based on the calories to be consumed by ingesting the beverage 16, the alcohol to be consumed by ingesting the beverage 16, the caffeine to be consumed by ingesting the beverage 16, etc. Other proxy values can be used.

In some embodiments, the processor 22 can cause the condition source 24 to modify the marker 12 each time the marker 12 is read, each time a dispensement is made, and/or based on some other parameter or event (e.g., during a concert, during happy hour, during a free refill time period, etc.). For example, the marker 12 may not be modified unless the beverage container 14 is being used (or was used) as a refill, or is being used (or was used) as a second refill, or a third refill, etc. The marker 12 may not be modified unless a certain type of beverage 16 is being dispensed (or was dispensed). The marker 12 may not be modified unless a certain dispensing apparatus 18 and/or a certain dispensing head 32 is being used (or was used). The marker 12 may not be modified unless it is a certain day of the week, time of day, etc.

EXAMPLES

Figure 5:
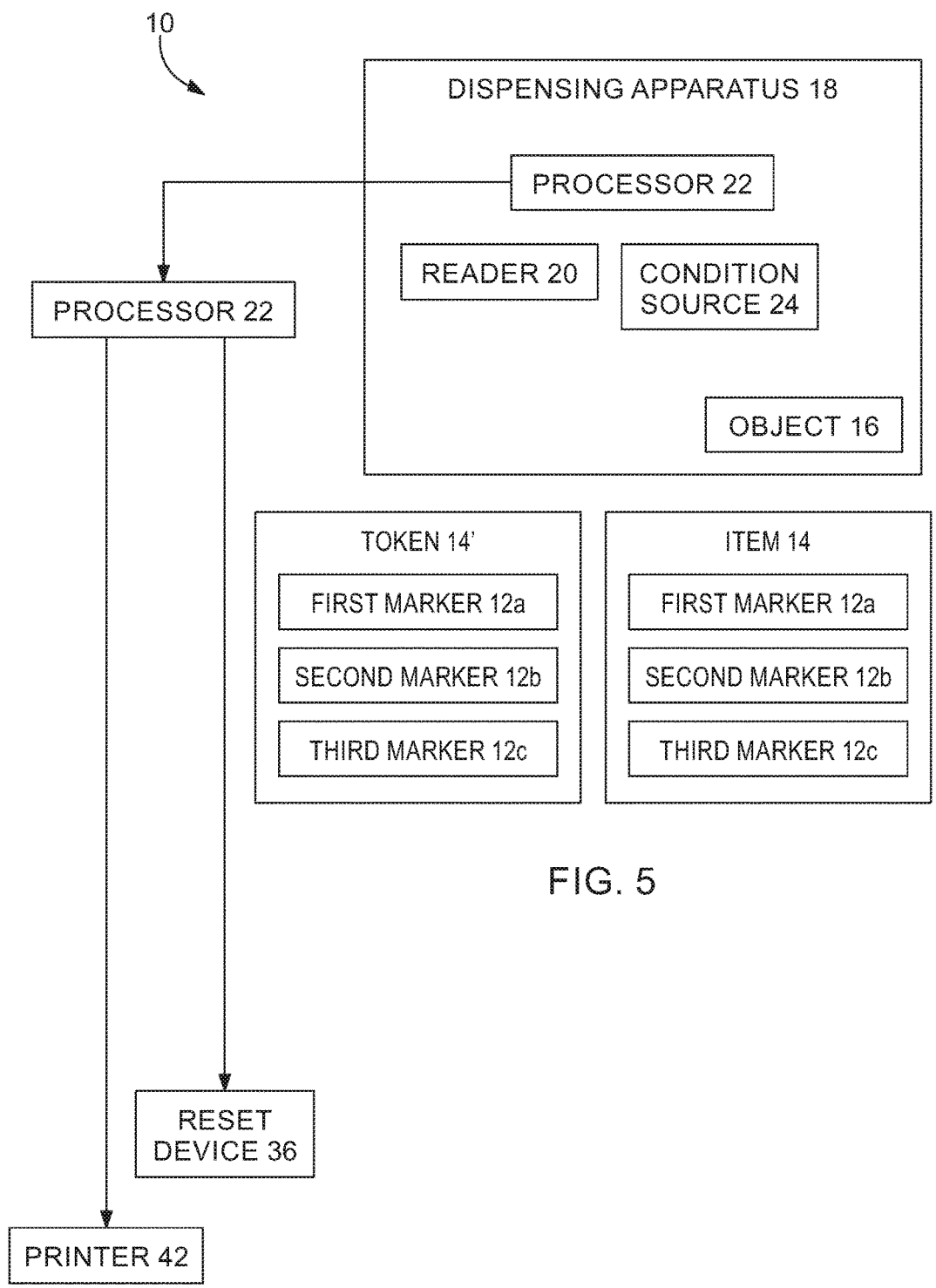
FIG. 5 is an exemplary block diagram of an embodiment of the system.
Figure 6:
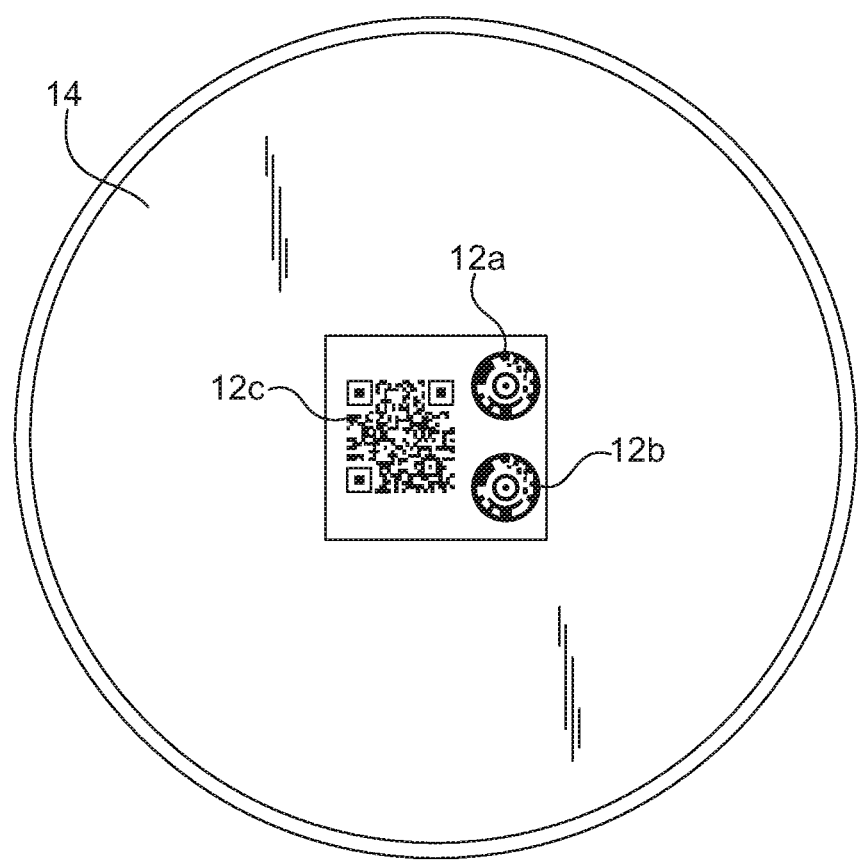
FIG. 6 is an embodiment of a beverage container with a plurality of markers associated therewith.

Referring to FIGS. 5-6, at least one embodiment can include a plurality of markers 12. Any one of the markers 12 can be a modifiable marker 12. Any one of the markers 12 can be the same as or different from any one of the other markers 12. For example, a first marker 12 and a second marker 12 may be associated with the beverage container 14. The first marker 12 may be a modifiable marker. The second marker 12 may be a non-modifiable marker. The first marker 12 may be used to track certain information about beverage 16 and/or use of the beverage container 14. The second marker 12 may be used to track information regarding the beverage container 14. For example, the first marker 12 may be ink. The ink may be printed on a portion of the beverage container 14. The ink can be modifiable ink that is modified upon exposure and/or removal from exposure of electromagnetic radiation. For example, the ink can be UV modifiable, IR modifiable, etc. For instance, a condition source 24 can expose the ink to UV light. Upon exposure of the UV light, the ink may become more transparent, absorbent, change color, etc. In some embodiments, the ink can be a mixture of different electromagnetic radiation condition-setting inks. For example, the ink can be a mixture of UV ink and IR ink. The second marker 12 can be a barcode. The barcode may be placed on or in a portion of the beverage container 14. This can include being printed on a surface (e.g., bottom, side, lip, etc.) of the beverage container 14. The barcode may be written in normal (e.g., non-modifiable) ink. The barcode can include information related to an attribute or characteristic of the beverage container 14 (e.g., beverage container size, serial number, etc.), the beverage 16 to be dispensed in the beverage container 14, the company providing the beverage 16 service, the type of beverage 16 service, a location of the dispensing apparatus 18, a time that elapses between dispensements of beverage 16, the number of dispensements that remain, loyalty program information, marketing information, other identifying information, etc. The barcode can include, but not limited to, Quick Response (QR) codes, matrix barcodes, Maxicodes, high capacity color barcodes, data matrices, CrontoSigns, Aztec Codes, and/or other two-dimensional barcodes, etc. Any of the first and/or second ink marks may also include a pattern.

As shown in FIGS. 5-6, as another example, the beverage container 14 can be associated with a first marker 12a, a second marker 12b, and a third marker 12c. The first marker 12a and the second marker 12b may be used to track certain information about the beverage 16 and/or use of the beverage container 14. The third marker 12c may be used to track information regarding the beverage container 14. The first marker 12a may be a first ink mark. The first ink mark may be printed on a portion of the beverage container 14. The first ink mark may include ink that becomes transparent when exposed to a first wavelength of light, but is otherwise opaque or translucent. This may include IR or near-IR electromagnetic radiation (e.g., light at or near 800 nm). The second marker 12b may be a second ink mark. The second ink mark may be printed on a portion of the beverage container 14. The second ink mark may include ink that becomes transparent when exposed to a second wavelength of light, but is otherwise opaque or translucent. This may include UV electromagnetic radiation (e.g., light at or near 300 nm). In some embodiments, the first ink mark can be configured to remain opaque or translucent when exposed to UV electromagnetic radiation, including UV radiation at or near 300 nm.

In some embodiments, the second ink mark can be configured to remain opaque or translucent when exposed to IR or near-IR radiation, including IR or near-IR radiation at or near 800 nm. The third marker 12c can be a barcode. The barcode may be placed on or in a portion of the beverage container 14. This can include being printed on a surface of the beverage container 14. The barcode can include information related to an attribute or characteristic of the beverage container 14 (e.g., beverage container size, serial number, etc.), the beverage 16 to be dispensed in the beverage container 14, the company providing the beverage 16 service, the type of beverage 16 service, a location of the dispensing apparatus 18, a time that elapses between dispensements of beverage 16, the number of dispensements that remain, loyalty program information, marketing information, other identifying information, etc. The barcode may be written in normal (e.g., non-modifiable) ink. The barcode ink can be translucent or opaque. In some embodiments, the third marker 12c can be a non-modifiable mark.

The first ink mark may be used to indicate whether the fill (e.g., the beverage 16 being dispensed into the beverage container 14 from the dispensing apparatus 18) on the beverage container 14 is the first fill. The first fill may be the first time the dispensing apparatus 18 dispenses beverage 16 into the beverage container 14, the first time the dispensing apparatus 18 dispenses a certain type of beverage 16 into the beverage container 14, the first time the dispensing apparatus 18 dispenses beverage 16 into the beverage container 14 after the beverage 16 had been paid for, the first time the dispensing apparatus 18 dispenses beverage 16 into the beverage container 14 at a certain location, the first time the dispensing apparatus 18 dispenses beverage 16 into the beverage container 14 on a certain day, etc. For example, the beverage container 14 may be placed within readable-sight of the reader 20. If the first mark is readable, then the system 10 can determine that it is the first fill on the beverage container 14.

Upon dispensing beverage, the system 10 may cause the condition source 24 to emit IR light to cause the first ink mark to become transparent or otherwise unreadable by the reader 20. Alternatively, the first fill may be defined by a certain amount of beverage 16. Thus, the system 10 may not cause the condition source 24 to modify the first mark until a certain amount of beverage 16 has been dispensed, regardless of the number of times the dispensing apparatus 18 dispensed beverage 16 into the beverage container 14. Other parameters can be used to define the first fill. These can include the amount of alcohol content, the amount of calorie content, the amount of caffeine content, etc.

The second ink mark may be used to indicate whether the fill on the beverage container 14 is a second fill. The second fill may be the second time the dispensing apparatus 18 dispenses beverage 16 into the beverage container 14, the second time the dispensing apparatus 18 dispenses a certain type of beverage 16 into the beverage container 14, the first time the dispensing apparatus 18 dispenses beverage 16 into the beverage container 14 after the first fill of beverage 16 had been paid for, the second time the dispensing apparatus 18 dispenses beverage 16 into the beverage container 14 at a certain location, the second time the dispensing apparatus 18 dispenses beverage 16 into the beverage container 14 on a certain day, etc. For example, the beverage container 14 may be placed within readable-sight of the reader 20. If the first mark is unreadable but the second mark is readable, then the system 10 may determine that the fill attempted is the second fill.

Upon dispensing beverage, the system 10 may cause the condition source 24 to emit UV light to cause the second ink mark to become transparent or otherwise unreadable by the reader 20. Alternatively, the second fill may be defined by a certain amount of beverage 16. Thus, the system 10 may not cause the condition source 24 to modify the second mark until a certain amount of beverage 16 has been dispensed, regardless of the number of times the dispensing apparatus 18 dispensed beverage 16 into the beverage container 14. Other parameters can be used to define the second fill. These can include the amount of alcohol content, the amount of calorie content, the amount of caffeine content, etc.

The combination of the first in mark and the second ink mark may be used to indicate whether the fill on the beverage container 14 is a third fill. The third fill may be defined by an attempted fill that has not been paid for or otherwise not permitted (e.g., exceeding the number of calorie intake, exceeding the amount of alcohol content, etc.). For example, the beverage container 14 may be placed within readable-sight of the reader 20. If the first mark and the second are both unreadable then the system 10 may determine that the fill attempted is the third fill. The processor 22 may then prevent any one or any combination of dispensing heads 32 from dispensing beverage 16.

Figure 7A:
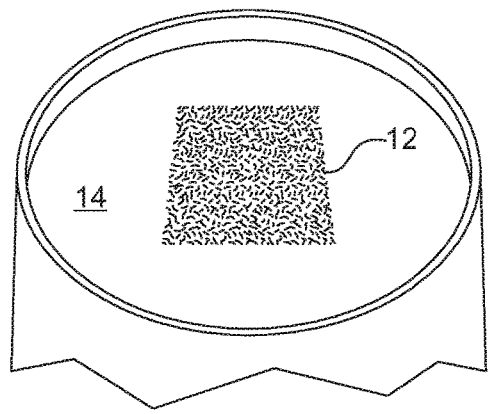
FIGS. 7A-7D are embodiments of a beverage container with a disappearing marker, a film marker, a written code marker, and a magnetic marker, respectively, that may be used with the system. Note that some embodiments can use thermal and/or ink that is invisible to the naked eye.
Figure 7B:
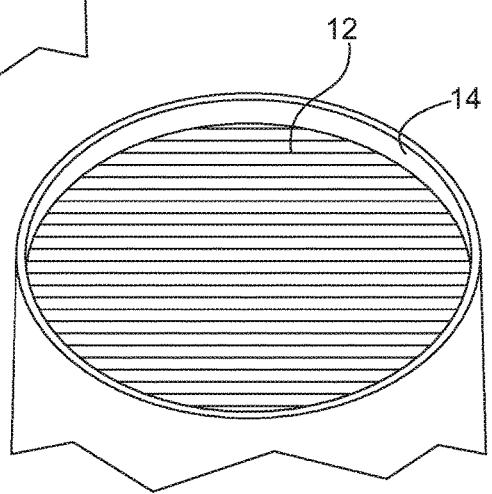
Figure 7C:
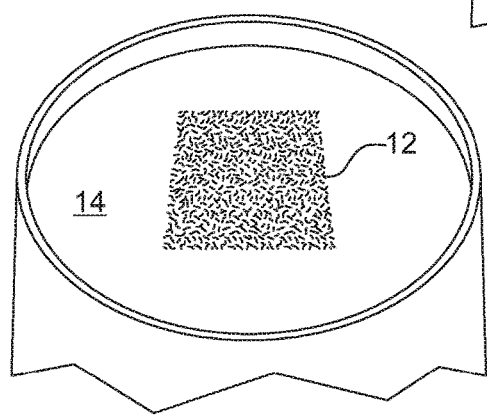
Figure 7D:
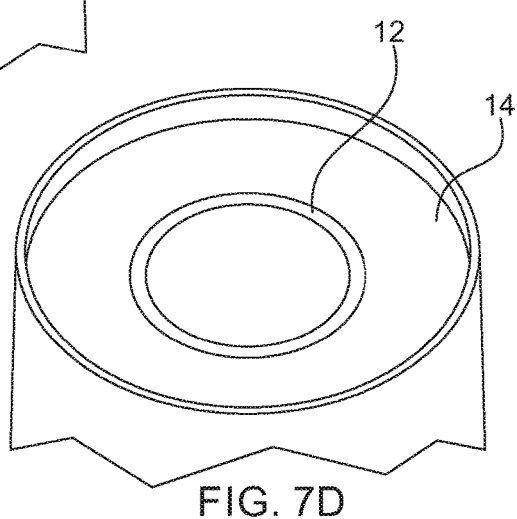

Referring to FIGS. 7A-7D, embodiments of the system can include different types of markers 12. Each of FIGS. 7A-7D show a marker 12 placed on a bottom surface of a beverage container 14; however, the markers 12 can be placed on any surface or portion of the beverage container 14. FIG. 7A shows a marker 12 that can be configured to disappear upon being subject to the condition. FIG. 7B shows a marker 12 that can be configured as a film attached to a surface of the beverage container 14. Using a film as a marker 12 may eliminate the need to index paper stock that may be used during the manufacturing process of the beverage container 14. For example, the beverage container 14, or at least a portion of it, may be fabricated from paper. If the marker 12 is printed or embossed on the beverage container 14, the manufacturing process may require indexing the paper stock. Thus, use of a film may prevent the need for additional equipment to be installed on existing process lines. This may facilitate keeping the cost of marker 12 application low. FIG. 7C shows a marker 12 that may be configured to embody a written code. FIG. 7D shows a marker 12 that may be configured as a magnetic strip material.

In at least one embodiment, a beverage container 14 may be associated with one marker 12. The marker 12 can be made with different compositions and/or with different thicknesses that can determine the rate at which the marker 12 changes. This is may be beneficial when attempting to control volume. For example, a 32-ounce beverage container 14 may include a marker 12 that when activated disappears (or otherwise becomes unreadable) within 8 seconds. A 16-ounce beverage container 14 may include a marker 12 that when activated disappears (or otherwise becomes unreadable) within 4 seconds. This dispensement of beverage 16 may flow from the dispensing apparatus 18 at a rate of 4 ounces per second. Thus, the processor 22 may be programmed to allow the dispensing apparatus 18 to dispense beverage when the marker 12 is within the readable-sight of the reader 20 and the reader 20 detects the marker 12. The dispensement of beverage 16 may occur upon activation of a dispensing head 32. The dispensement of beverage 16 may stop after the marker 12 is no longer readable, even though the marker 12 is still within the readable-sight of the reader 20 and/or regardless of the dispensing head 32 being activated.

Referring FIGS. 5 and 8-9B, a user may purchase another fill or purchase another plurality of fills. For example, a user may do this after a user exhausts the number of allowable fills. After purchasing another fill or plurality of fills, the beverage container 14 may be placed into a reset device 36. The reset device 36 may include at least one condition source 24. The reset device 36 can activate the at least one condition source 24 to cause the first and second marks to modify and become opaque or otherwise readable by the reader 20 (i.e., the marks can become re-set). The reset device 36 may be in electrical communication with the processor 22. This can include being in wireless communication.

In some embodiments, the reset device 36 can be part of a dishwasher. In some embodiments, the reset device 36 can be in electrical communication with the dishwasher. This can include being in wireless communication. The dishwasher can be an automatic dishwasher machine. During a reset phase, a user may deposit the beverage container 14 into a beverage container receptacle 38. For example, the beverage container 14 may be placed within an inlet 40a of the beverage container receptacle 38. The beverage containers 14 within the beverage container receptacle 38 may then be transported to the dishwasher for cleaning. Alternatively, the beverage container 14 may exit the beverage container receptacle 38 via an outlet 40b. Any of the inlets 40a and/or outlets 40b can be configured as a chute. The outlet 40b may direct the beverage container 14 into the dishwasher. The dishwasher can include a wash cycle, a sanitize cycle, and/or a rinse cycle. As the beverage container 14 is passed through the dishwasher, the condition source 24 can be activated. This may cause at least one of the markers 12 to re-set. As the beverage container 14 exits the dishwasher, the beverage container 14 and its markers 12 can be ready for continued use.

In some embodiments, the dishwasher may have a queue capability that allows it to handle fluctuations in beverage container 14 dishwashing through-put volume. Some embodiments can include a customizable number of input and output locations and/or streams. For example, one input stream and/or output stream may be configured for low volume dishwashing (e.g., a low rate of washing beverage containers 14 and/or a low rate of running the beverage containers 14 through the dishwashing machine). Other input and or output streams may be configured for higher volume of dishwashing. Some embodiments can include more than one input and/or output stream.

Figure 8:
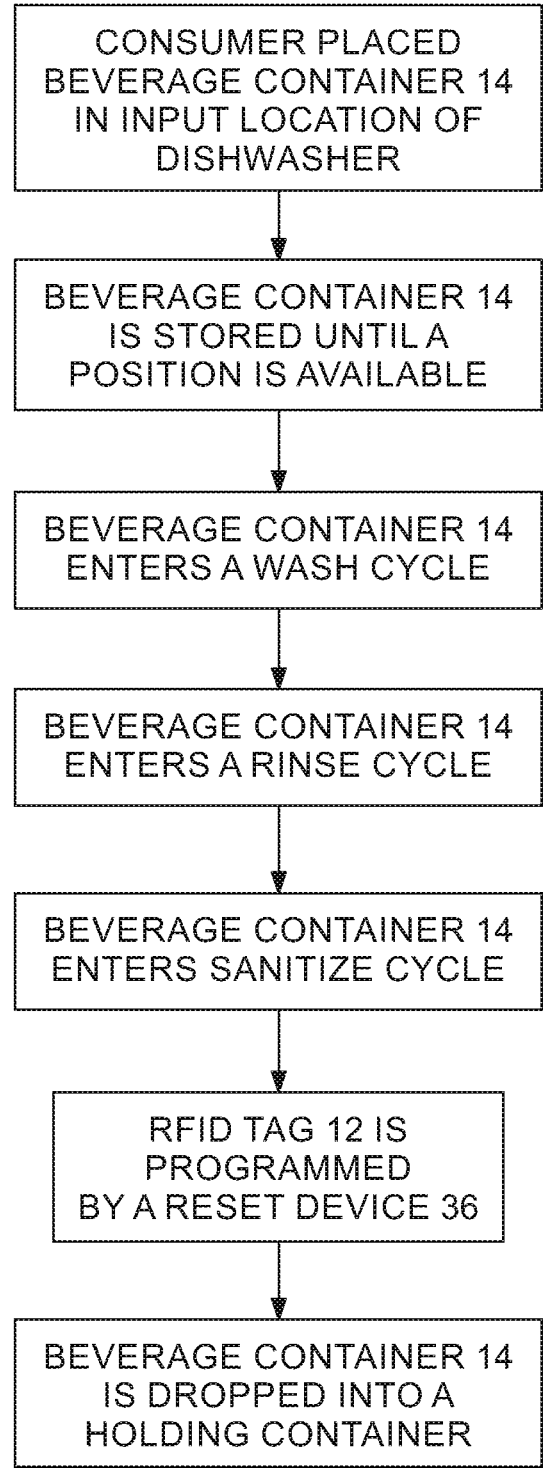
FIG. 8 shows an exemplary process flow that may be used for carrying out an embodiment having a reset device.
Figure 9A:
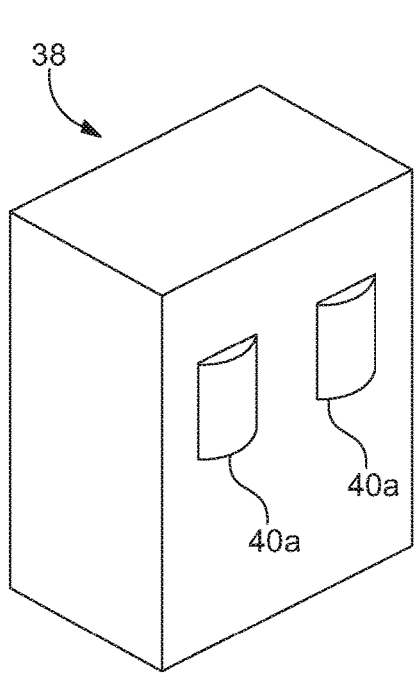
FIGS. 9A-9B show perspective front and perspective rear views, respectively, of an embodiment of a beverage container receptacle that may be used with the system.
Figure 9B:
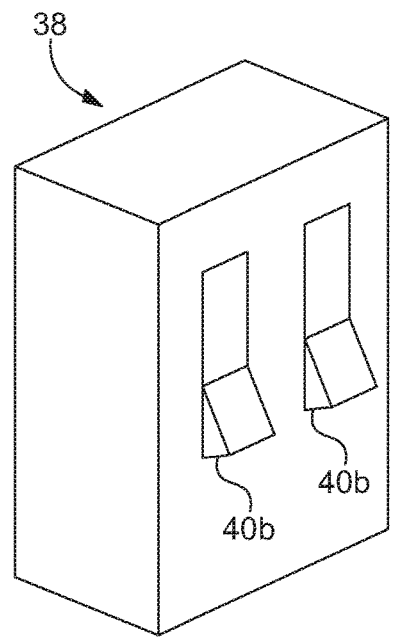

FIG. 8 shows an exemplary process flow that may be used for carrying out an embodiment of the reset device 36 configured as a dishwasher. A use may place a beverage container 14 in an input location of a dishwasher. The beverage container 14 may be stored or held in place until a position in the dishwashing queue is available. Once available, the beverage container 14 may be caused to enter an input stream. Once in the input stream, the beverage container 14 may enter a wash cycle. The beverage container 14 may further enter a rinse cycle. The beverage container 14 may further enter a sanitization cycle. The beverage container 14 may further pass by at least one condition source 24 of a reset device 36. FIG. 8 shows a marker 12 being configured as an RFID tag and the RFID tag being reprogrammed by the reset device 36. Thus, the reprogramming of the RFID tag marker 12 can be the re-set action. The beverage container 14 may be caused to exit the dishwasher. This may include being placed into a holding container. The process steps outlines above are exemplary. Other process steps and orders of the process steps can be used. For example, there can be more or less rinse cycles, sanitization cycles, etc. Any of the cycles can be omitted and/or switched in position. Any of the process steps can occur multiple of times.

Other combinations of markers 12, sensing schemes, and/or permutations of recording fills/refills can be used. For example, in addition to or in alternative to, the beverage container 14 being associated with a marker 12, a card, a bracelet, a pendant, or some other token 14' may be associated with a marker 12. (See FIG. 5). For instance, the token 14' can be associated with a first marker 12. The first marker 12 can be an RFID tag. The RFID tag may be attached to or embedded within a portion of the token 14'. The beverage container 14 can be associated with a second marker 12. The second marker 12 can be modifiable ink. The modifiable ink may be printed on a portion of the beverage container 14. The second marker 12 can be thermal ink that is modifiable by a change in heat energy. The RFID tag may be a read-write RFID tag. The RFID tag may be programmed to include information about the beverage container 14, the user of the beverage container, beverage purchase information (e.g., number of fills or refills purchased, amount of beverage purchased, etc.), the type of beverage service, the company offering the beverage service, etc. The second marker 12 can include information about usage of the beverage container 14.

The beverage container 14 may be placed within readable-sight of the reader 20. If the second mark is readable, then the system 10 can determine that it is the first fill on the beverage container 14. If the second mark is not readable, then the system 10 can determine that a second fill is being attempted. The system 10 may be configured to allow a first fill but to prevent a second fill. If it is determined that it is a first fill that is being performed on the beverage container 14 and a user places the token 14' within readable-sight of the reader 20, the reader 20 may then acquisition information from the RFID tag. In addition, or in the alternative, the processor 22 can transmit information to the RFID tag to update the RFID tag with statistics of the use/consumption of the beverage 16 and/or beverage container 14. This information may be transmitted to another processor 22 of the system 10. Other combinations of markers 12, tokens 14', sensing schemes, and/or permutations of recording can be used with embodiments that include the token 14'. For example, there can be more than one marker 12 for the token 14', more than one marker 12 for the beverage container 14, more than one property change for each marker 12, etc.

Furthermore, the token 14' can include any of the markers 12 disclosed herein, and is thus not limited to use of an RFID tag.

Some embodiments may include a printer 42. The printer 42 can be part of the system 10. The printer 42 may be separate from the system 10 but be in electrical communication with the system 10. This can include wireless communication. For example, a printer 42 may be located at a point of sale ("POS") where a user may purchase the amount of beverage 16. The printer 42 can be configured to associate a marker 12 with an item 14, 14'. With some embodiments, upon purchasing the amount of beverage 16, the printer 42 can be used to associate the marker 12 with the beverage container 14 and/or token 14'. For example, the printer 42 may be able to write a marker 12 in the form of a code onto the beverage container 14 and/or token 14', apply a film to the beverage container 14 and/or token 14', print ink on the beverage container 14 and/or token 14', etc. During use of the beverage container 14 and/or token 14' with the dispensing apparatus 18, the marker 12 can be placed within readable-sight of the reader 20. The code within the marker 12 may be deciphered by the processor 22. The code may contain a date stamp, a time stamp, the size of the beverage cup, the number of fills and/or refills purchased, the time between fills and/or refills, etc.

In some embodiments, a reset device 36 may be used at the POS. The reset device 36 at the POS can be used to re-set the item 14, 14'.

Some embodiments can be configured to allow fills and/or refills during certain events. The events can include, but are not limited to, a concert, a happy hour, a free fill and/or refill hour, etc. The free refill hour, for example, can be for a specific hour for all users. Alternatively, or in addition, the free refill hour can be for an hour applied to each individual user. For example, the information obtained from the marker 12 can provide a time for which the first fill occurred for that particular user. The user may then have one hour to receive a predetermined amount of fills and/or refills from that first fill, which may be free. The same may be applied to another user. The first fill time for one user may be the same as or may be different from the first fill time for a second user. Thus, while each user may receive a free refill hour, the begin and end times for the one-hour time period for each may be different.

Figure 10:
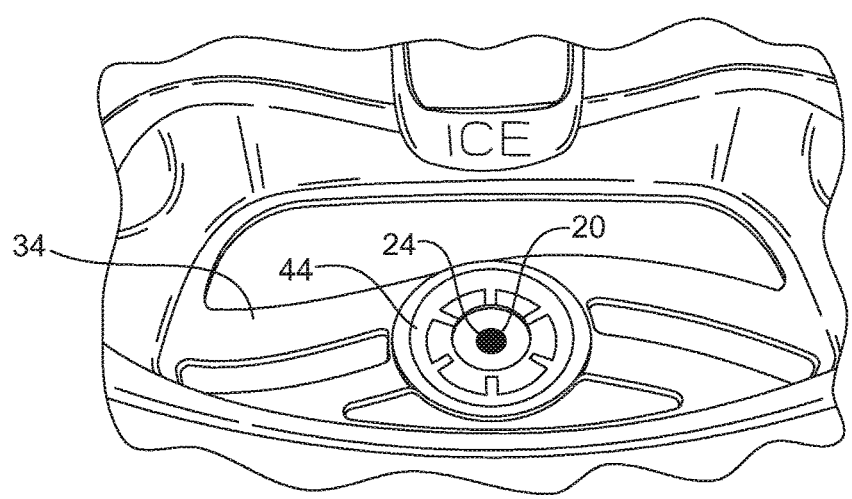
FIG. 10 is an embodiment of a dispensing apparatus, showing a partial view of a tray portion that may be used with the system.
Figure 11B:
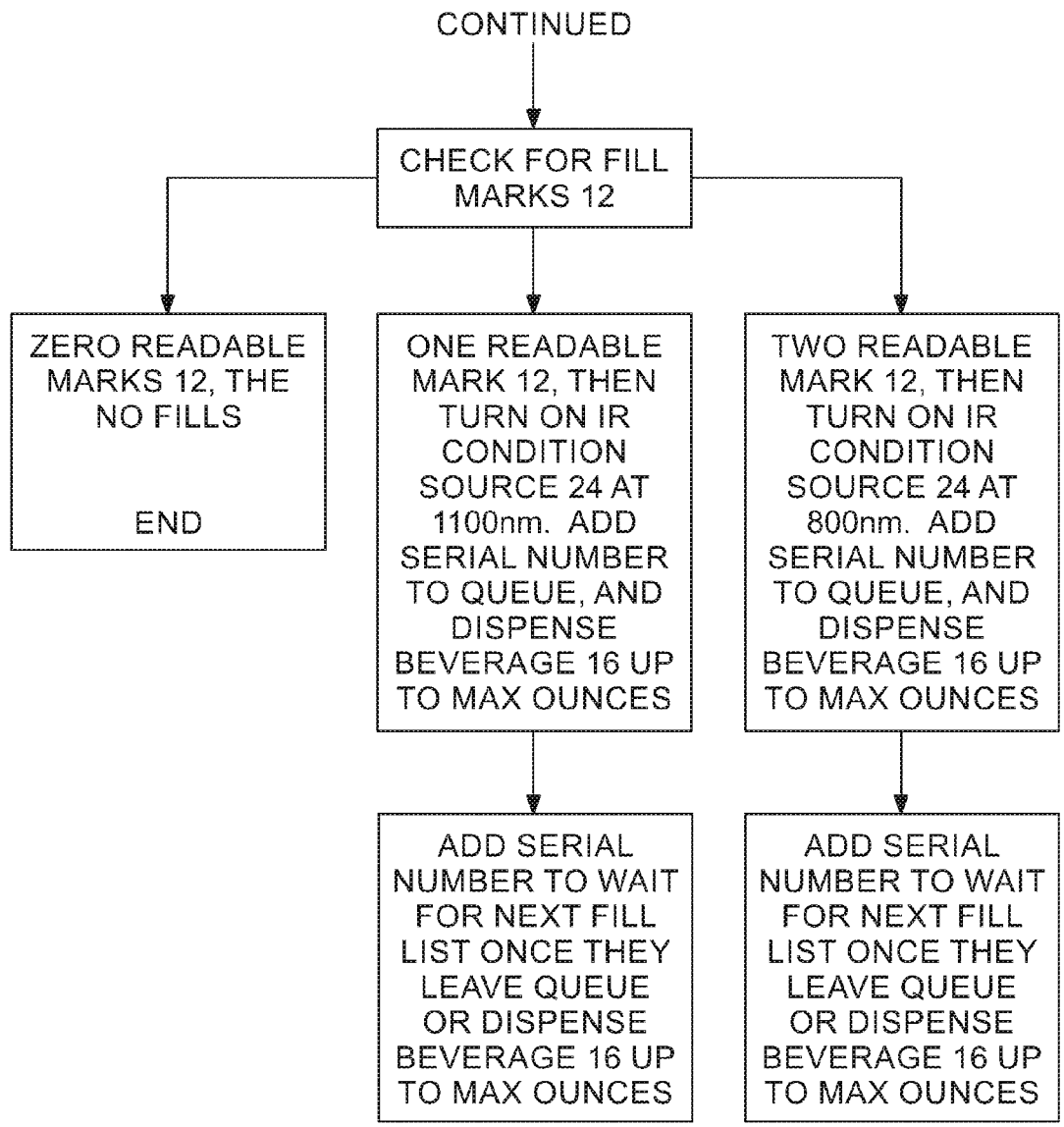

Referring to FIGS. 10-11B, embodiments of the system 10 can be incorporated to an existing design platform of a dispensing apparatus 18. For example, the dispensing apparatus 18 can be a new dispensing apparatus being manufactured or an existing dispensing apparatus 18 that is already being used to dispense beverage 16. Any of the new dispensing apparatuses 18 may be configured for tracking. This can include conventional tracking methods and/or use of the inventive tracking methods. Any of the used dispensing apparatuses 18 may be configured for tracking, which may include conventional racking methods. Simple design changes and/or simple manufacturing process changes can be performed to facilitate incorporation of the inventive tracking system components to a new dispensing apparatus 18. Simple retrofitting can be performed to facilitate incorporation of the inventive tracking system components into a used dispensing apparatus 18. For example, FIG. 10 shows a tray 34 portion of dispensing apparatus 18.

A reader 20 and/or condition source 24 (e.g., one illustrated in FIG. 3, for example) may be installed within the drain of the tray 34. In some embodiments, a shield 44 may be installed at, near, or over the drain. The shield 44 may be configured as a filter to prevent unwanted or inadvertent exposure of a harmful condition (e.g., UV light) to a user. For instance, the shield 44 maybe a low-pass or high-pass filter to block UV light from exiting the tray 42 at an angle that would otherwise cause it to be incident upon a user. If a new or additional processor 22 is required for the dispensing apparatus 18 to be able to use any of the inventive system 10 components, the processor 22 can be configured to operate on the auxiliary power of the dispensing apparatus 18. However, the processor 22 may receive electrical power from other sources.

The inventive system 10 can be used to replace and/or augment conventional tracking technology. For example, FIGS. 11A-11B show an exemplary process flow that may be used for carrying out an embodiment of the inventive method. FIG. 11B is a continuation of FIG. 11A. FIGS. 11A-11B show a system that includes conventional tracking methods used in conjunction with the inventive tracking methods. With this exemplary embodiment, a user may place a beverage container 14 on a tray 34 of a dispensing apparatus 18. The dispensing head 32 may be activated. Upon activation of the dispensing head 32, and before dispensing beverage 16, the processor 22 may activate at least one of the reader and/or the condition source 24. The reader may be an RFID scanner and/or a camera, for example. The condition source 24 may be a visible light source, for example. The beverage container 14 may be associated with a QR barcode marker 12 or an RFID tag marker 12. If the RFID tag marker 12 is readable and/or activated, the system 10 may dispense beverage 16. If the QR barcode is readable, the QR barcode may be verified and/or validated. In some embodiments, both the RFID tag marker 12 and the QR barcode can have an assigned serial number generated when they are manufactured. When the RFID tag marker 12 tag or barcode is first presented to the system 10, the serial number(s) can be stored. Furthermore, a dispensed volume can be assigned to the serial number(s). In some embodiments, the dispensed volume can be assigned to the serial number(s) until: 1) a maximum allowed quantity of beverage is dispenses (ounces, calories, sugar, etc.); and/or 2) a time limit has expired for the allowable time the beverage container 14 is allowed for a fill. The system 10 may then determine if a serial number associated with the beverage container 14 is within a queue. If the serial number is within the queue, the system 10 may dispense beverage 16. If the serial number is not within the queue, the system 10 may determine if the serial number is in a waiting queue for a refill list. If the serial number is within the waiting queue for a refill list then the processor 22 may prevent dispensement of beverage 16. If the serial number is not within the waiting queue for a refill list then the processor 22 may activate the condition source 24.

The system 10 may then determine if any fill marks 12 (e.g., identifiable marks indicating that a fill is allowed) are detectable and/or readable. If there are no readable fill marks, then the processor 22 may prevent dispensement of beverage 16.

If there is one readable fill mark, then the processor 22 may activate the condition source 24. The condition source 24 may be a 1100 nm LED source. The system 10 may add the serial number to the queue. The processor 22 may then cause the system 10 to dispense beverage 16. This may include dispensing beverage 16 up to a maximum amount that may be defined for the fill. The serial number may then be added to the waiting queue for the next fill once the serial number leaves the queue and/or dispensement of the maximum amount for the fill has occurred.

If there are two readable fill marks, the processor 22 may activate the condition source 24. The condition source 24 may be a 800 nm LED source. The system 10 may add the serial number to the queue. The processor 22 may then cause the system 10 to dispense beverage 16. This may include dispensing beverage 16 up to a maximum amount that may be defined for the fill. The serial number may then be added to the waiting queue for the next fill once the serial number leaves the queue and/or dispensement of the maximum amount for the fill has occurred.

With the exemplary process flow described in FIGS. 11A-11B, it can be seen that conventional tacking methods can be used in conjunction with the inventive tracking methods. Further, the inventive tracking methods can be incorporated without any disruption or interference with the conventional tracking methods.

In some embodiments, the item 14, 14' can be re-usable, disposable, and/or recyclable. Some embodiments can facilitate use of re-usable, disposable, and/or recyclable items 14, 14 with little to no additional costs that may otherwise occur from the refillable, re-usable, and/or disposable nature of the items 14, 14'. For example, any of the items 14, 14' can be fabricated from plastic, glass, ceramic, metal, paper, pulp, etc. Including embodiments of the markers 12 disclosed herein with the items 14, 14' can allow for production of items 14, 14' that are re-usable, disposable, and/or recyclable without adding, or at least adding very little, to the normal costs associated with producing, re-using, and/or recycling such items 14, 14'. For example, any of the materials used to produce the markers 12 can be cost-effective, as well as re-usable, disposable, and/or recyclable. Further, any of the materials used to produce the markers 12 can be recycled in a compatible manner with the items 14, 14'. For example, the inks used for the marker 12 can be configured to not change the recyclability of the items 14, 14'. In some embodiments, any one or combination of dispensing apparatuses 18 can be used to track any one or combination of re-usable, disposable, and/or recyclable items 14, 14'.

The examples described herein are only exemplary. It should be understood that modifications to the embodiments disclosed herein can be made to meet a particular set of design criteria. For instance, the number of systems 10, markers 12, items 14, objects 16, dispensing apparatuses 18, readers 20, reset devices 36, tokens 14', beverage container receptacles 38, condition sources 24, processors 22, printers 40, marker properties, conditions, and other properties, conditions, parameters, and/or components can be any suitable number of each to meet a particular objective. The particular configuration of type of such features and components can also be adjusted to meet a particular set of design criteria. Therefore, while certain exemplary embodiments have been discussed and illustrated herein, it is to be distinctly understood that the invention is not limited thereto but may be otherwise variously embodied and practiced within the scope of the claims following the detailed description.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A tracking device, comprising:
   at least one marker configured to be associated with an item, the at least one marker comprising ink that has at least one property, the at least one property being identifiable to generate first tracking information;
   wherein the at least one property is modifiable via exposure to at least one condition and/or removal from exposure of the at least one condition, the at least one modified property being identifiable to generate second tracking information; and
   wherein the first tracking information and the second tracking information are used to identify, track, and/or monitor at least one attribute of the item and/or use of the item.

2. The tracking device recited in claim 1, wherein the item is associated with an object.

3. The tracking device recited in claim 2, wherein the item comprises at least one of a beverage cup and a token, and the object comprises beverage.

4. The tracking device recited in claim 2, wherein the first tracking information and the second tracking information is used to identify, track, and/or monitor at least one attribute of the item, at least one attribute of the object, at least one use of the item, and/or at least one use of the object.

5. The tracking device recited in claim 1, wherein the at least one modified property is further modifiable.

6. The tracking device recited in claim 5, wherein the at least one property and/or the at least one modified property comprises at least one of a physical property, a chemical property, an optical property, a magnetic property, an electrical property, a readable property, a non-readable property, a pattern, and a disappearing property.

7. The tracking device recited in claim 5, wherein the at least one property comprises a plurality of properties and/or the at least one modified property comprises a plurality of modified properties.

8. The tracking device recited in claim 1, wherein the at least one condition comprises exposure to infrared radiation.

9. The tracking device recited in claim 1, wherein the at least one condition comprises exposure to ultraviolet radiation.

10. The tracking device recited in claim 1, wherein the at least one condition comprises at least one of electromagnetic radiation, an electric field, a magnetic field, a chemical, heat energy, pressure, acoustic energy, and physical contact.

11. The tracking device recited in claim 10, wherein the at least one condition further comprises at least one of magnitude, intensity, rate of change, frequency, and vector direction of the at least one condition.

12. The tracking device recited in claim 1, wherein the at least one property and/or the at least one modified property is modified by at least one of changing all at once, changing incrementally, changing as a function with which the at least one marker is subject to the at least one condition, and changing as a function of time.

13. The tracking device recited in claim 1, wherein the at least one property and/or the at least one modified property is modified by at least one of changing as a function of intensity, rate, and frequency with which the at least one condition occurs.

14. The tracking device recited in claim 1, wherein a plurality of conditions generates a single change in a single property and/or a single change in a single modified property.

15. The tracking device recited in claim 1, wherein a single condition generates a change in a plurality of properties and/or a change in a plurality of modified properties.

16. The tracking device recited in claim 1, wherein the at least one property and/or the at least one modified property is identifiable and/or not identifiable by a reader.

17. The tracking device recited in claim 16, wherein the at least one property and the at least one modified property generates at least one readable state and/or at least one non-readable state.

18. An item for a tracking system, comprising:
at least one item; and
at least marker associated with the at least one item, the at least one marker comprising ink that has at least one property, the at least one property being identifiable to generate first tracking information;
wherein the at least one property is modifiable via exposure to at least one condition and/or removal from exposure of the at least one condition, the at least one modified property being identifiable to generate second tracking information; and
wherein the first tracking information and the second tracking information is used to identify, track, and/or monitor at least one attribute of the at least one item and/or use of the at least one item.

19. A tracking system, comprising:
at least one marker associated with an item, the at least one marker comprising ink that has at least one property, the at least one property being identifiable to generate first tracking information, wherein the at least one property is modifiable, the at least one modified property being identifiable to generate second tracking information, wherein the at least one property and/or the at least one modified property is modifiable due to the at least one marker being subject to at least one condition;
at least one reader configured to capture the first tracking information and/or the second tracking information;
at least one condition source configured to subject the at least one marker to the at least one condition; and
at least one processor configured to receive and process the first tracking information and/or the second tracking information to identify, track, and/or monitor at least one attribute of the item and/or use of the item.

20. The tracking system recited in claim 19, further comprising a reset device.

21. A tracking system, comprising:
at least one marker associated with a beverage container, the at least one marker comprising ink that has a first property, the first property being identifiable to generate first tracking information, wherein the first property is modifiable to generate a second property, the second property being identifiable to generate second tracking information, wherein the first property and/or the second property is further modifiable due to the at least one marker being subject to at least one condition;
at least one reader configured to capture the first tracking information and/or the second tracking information;
at least one condition source configured to subject the at least one marker to the at least one condition,
at least one processor configured to receive and process the first tracking information and/or the second tracking information to identify, track, and/or monitor at least one attribute of the beverage container and/or use of the beverage container; and
a reset device configured to cause the at least one marker to modify from the second property to the first property.

22. The tracking system recited in claim 21, wherein the reset device is part of a dishwasher.

23. The tracking system recited in claim 22, wherein the dishwasher is configured to receive the beverage container, subject the beverage container to at least one of a wash cycle, a sanitize cycle, and/or a rinse cycle, wherein the reset device causes the at least one marker of the beverage container to modify from the second property to the first property before the beverage container exits the dishwasher.

* * * * *